(12) United States Patent
Shingu

(10) Patent No.: US 12,212,855 B2
(45) Date of Patent: Jan. 28, 2025

(54) CONTROL METHOD, CONTROL DEVICE, AND IMAGING DEVICE INCLUDING INTERRUPTED DETECTION LIGHT IN EXPOSURE PERIOD

(71) Applicant: Panasonic Intellectual Property Management Co., Ltd., Osaka (JP)

(72) Inventor: Yasuhiro Shingu, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 233 days.

(21) Appl. No.: 17/832,658

(22) Filed: Jun. 5, 2022

(65) Prior Publication Data

US 2023/0224594 A1    Jul. 13, 2023

(30) Foreign Application Priority Data

Jan. 7, 2022    (JP) ................................. 2022-001634

(51) Int. Cl.
*H04N 23/74* (2023.01)
*G02F 1/133* (2006.01)
*H04N 23/56* (2023.01)
*H04N 23/71* (2023.01)

(52) U.S. Cl.
CPC ......... *H04N 23/74* (2023.01); *G02F 1/13318* (2013.01); *H04N 23/56* (2023.01); *H04N 23/71* (2023.01)

(58) Field of Classification Search
CPC ........ H04N 23/74; H04N 23/56; H04N 23/71; G02F 1/13318
See application file for complete search history.

(56) References Cited

U.S. PATENT DOCUMENTS

| 2016/0313245 | A1 | 10/2016 | Sato et al. |
| 2017/0108725 | A1 | 4/2017 | Morita et al. |
| 2020/0257182 | A1 | 8/2020 | Takahashi |
| 2023/0005234 | A1* | 1/2023 | Wang ..................... G06V 10/60 |

FOREIGN PATENT DOCUMENTS

| JP | 1994-050885 | A | 2/1994 |
| JP | 2008-070432 | A | 3/2008 |
| JP | 2012-173328 | A | 9/2012 |
| JP | 2019-184464 | A | 10/2019 |
| WO | 2015/104885 | A1 | 7/2015 |
| WO | 2015/151579 | A1 | 10/2015 |
| WO | 2019/087929 | A1 | 5/2019 |

\* cited by examiner

*Primary Examiner* — Sinh Tran
*Assistant Examiner* — Angel L Garces-Rivera
(74) *Attorney, Agent, or Firm* — Renner, Otto, Boisselle & Sklar, LLP

(57) ABSTRACT

A control method for controlling a light control module including a light emitter that radiates detection light according to the present disclosure, includes interrupting radiation of the detection light by the light emitter in at least part of an exposure period in which exposure is being performed in still image shooting or moving image shooting.

17 Claims, 10 Drawing Sheets

CONTROL METHOD, CONTROL DEVICE, AND IMAGING DEVICE INCLUDING INTERRUPTED DETECTION LIGHT IN EXPOSURE PERIOD

CROSS-REFERENCE TO RELATED APPLICATIONS

This application claims priority to Japanese Patent application No. 2022-001634, filed Jan. 7, 2022, and the disclosure of which is incorporated herein by reference in the entirety.

BACKGROUND OF THE INVENTION

Field of the Invention

The present disclosure relates to a control method and a control device for controlling a light control module including a light emitter that radiates detection light, and relates to an imaging device including the light control module.

Description of the Related Art

For example, WO 2015/151579 A discloses an imaging device including a light control module that includes: a liquid crystal layer provided between a pair of electrodes; and a transmittance sensor that detects light transmittance of the liquid crystal layer. The transmittance sensor of the light control module includes: a light emitter; and a light receiver facing the light emitter with a liquid crystal layer interposed therebetween.

SUMMARY OF THE INVENTION

However, the imaging device described in WO 2015/151579 A still has room for improvement in reduction of leaked light.

Therefore, an object of the present disclosure is to provide a control method for a light control module and a control device that reduce leaked light, and is to provide an imaging device including the control device.

To solve the above issue, a control method for controlling a light control module including a light emitter that radiates detection light according to one aspect of the present disclosure includes:
interrupting radiation of detection light by a light emitter in at least part of an exposure period in which exposure is being performed in still image shooting or moving image shooting.

A control device of one aspect of the present disclosure controls a light control module including a light emitter that radiates detection light, and the control device includes:
a processor; and
a storage medium storing an instruction to be executed by the processor,
wherein the instruction includes:
interrupting radiation of detection light by a light emitter in at least part of an exposure period in which exposure is being performed in still image shooting or moving image shooting.

An imaging device according to one aspect of the present disclosure includes:
a light control module including a light emitter that radiates detection light;
a control device that controls the light control module; and
an imaging element that images imaging light transmitted through the light control module,
wherein the control device includes:
a processor; and
a storage medium storing an instruction to be executed by the processor,
wherein the instruction includes:
interrupting radiation of detection light by a light emitter in at least part of an exposure period in which exposure is being performed in still image shooting or moving image shooting.

With the present disclosure, it is possible to provide a control method for a light control module and a control device that reduce leaked light, and it is possible to provide an imaging device including the control device.

DESCRIPTION OF THE PREFERRED EMBODIMENT

Hereinafter, an embodiment will be described in detail with reference to the drawings as appropriate. However, unnecessarily detailed description may be omitted. For example, detailed description of already well-known matters and repeated description of substantially the same configuration may be omitted. This is to prevent the following description from being unnecessarily redundant and to facilitate those skilled in the art to understand the present disclosure.

Note that the inventor or inventors provide the accompanying drawings and the following description for those skilled in the art to fully understand the present disclosure and the drawings and the description are not intended to limit the subject matters of the claims.

Hereinafter, a control method, a control device, and an imaging device according to a first embodiment of the present disclosure will be described with reference to the drawings.

First Embodiment

[Imaging Device]

Figure 1:
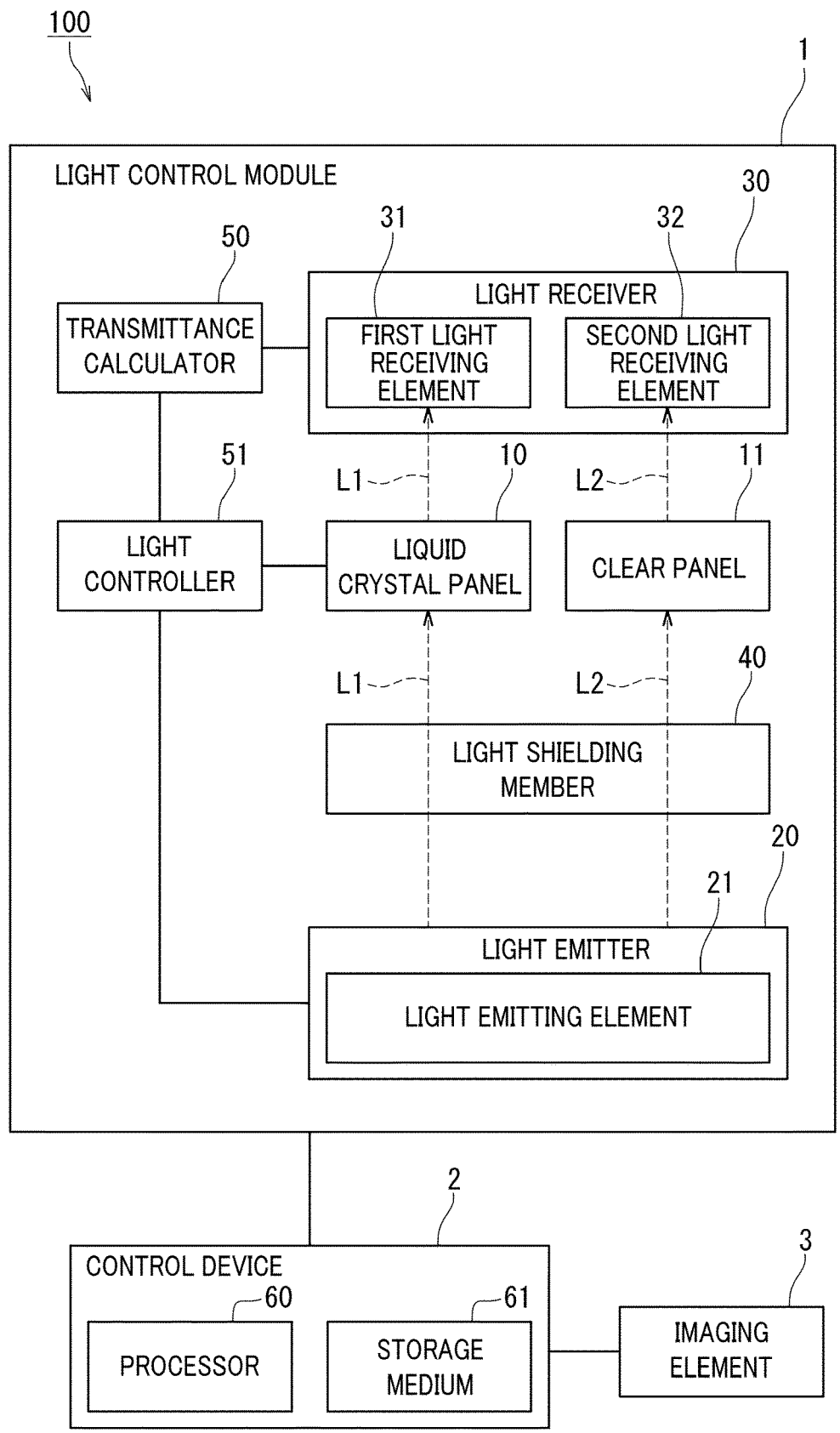
FIG. 1 is a schematic block diagram illustrating a configuration of an imaging device according to a first embodiment of the present disclosure.
Figure 2:
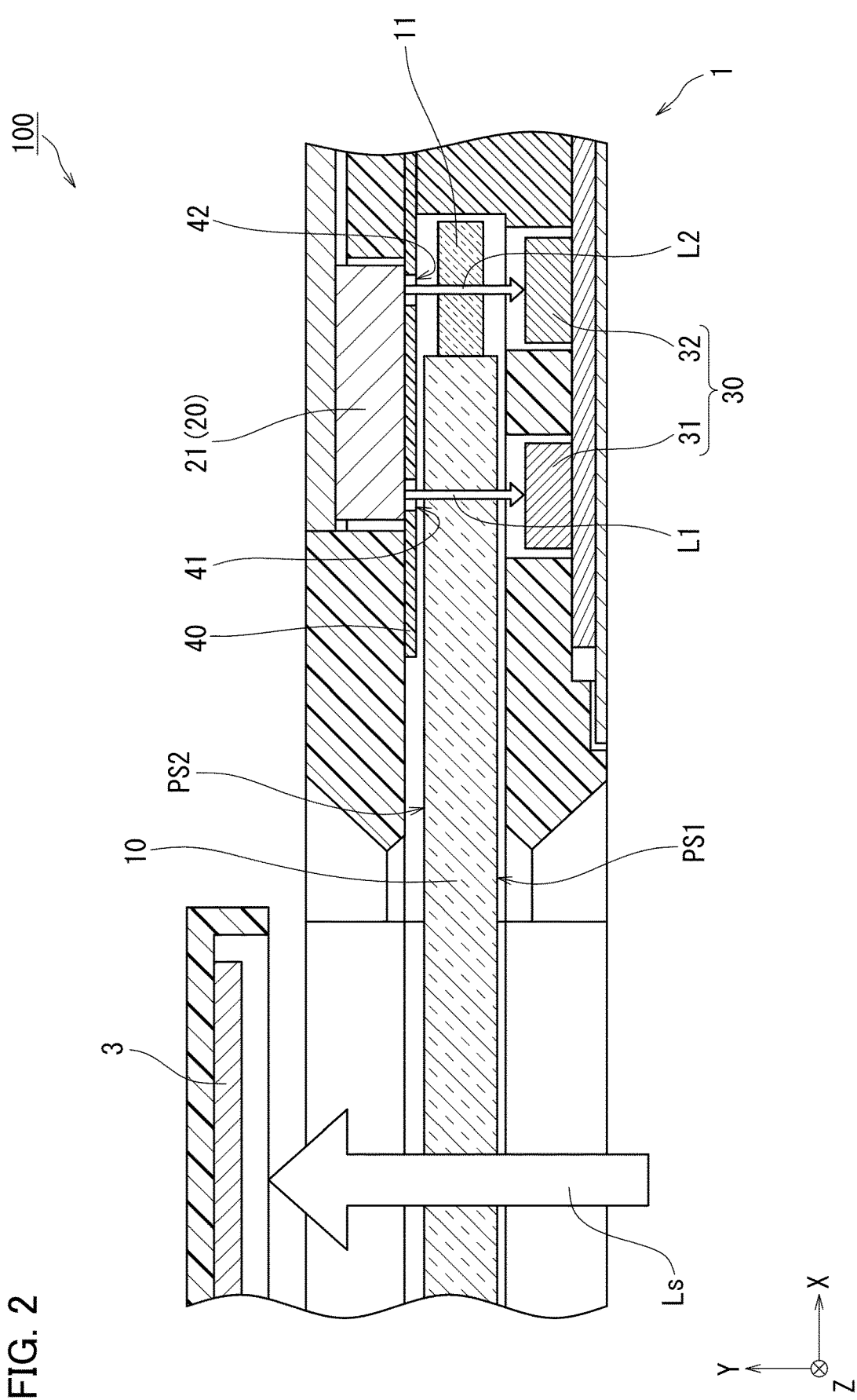
FIG. 2 is a schematic partial cross-sectional view illustrating a main configuration of the imaging device.

An imaging device according to a first embodiment of the present disclosure will be described with reference to FIGS. 1 and 2. FIG. 1 is a schematic block diagram illustrating a configuration of the imaging device according to the first embodiment of the present disclosure. FIG. 2 is a schematic partial cross-sectional view illustrating a main configuration of the imaging device.

Note that an X-Y-Z coordinate system illustrated in the figure is for facilitating understanding of the present disclosure, and does not limit the present disclosure. An X-axis direction indicates a left-right direction of a light control module 1, a Y-axis direction indicates a front-rear direction, and a Z-axis direction indicates a vertical direction. In addition, in the present specification, a first surface PS1 side of a liquid crystal panel 10 on which an imaging light Ls enters the light control module 1 is referred to as a "front side", and a second surface PS2 side opposite to the first surface PS1 is referred to as a "rear side".

As illustrated in FIG. 1, an imaging device 100 includes the light control module 1, a control device 2, and an imaging element 3. The imaging device 100 is, for example, an electronic device having an imaging function, such as a digital camera, a video camera, a smartphone, or a tablet terminal.

<Light Control Module>

The light control module 1 is a module that electrically controls the liquid crystal panel 10 to adjust a light amount of light incident on the liquid crystal panel 10. For example, the light control module 1 is used as a neutral density (ND) filter for the imaging device 100. The light control module 1 is disposed between a lens and the imaging element 3 in the imaging device 100. In this case, the front side of the light control module 1 corresponds to a side where the lens is disposed, and the rear side of the light control module 1 corresponds to a side where the imaging element 3 is disposed.

As illustrated in FIGS. 1 and 2, the light control module 1 includes the liquid crystal panel 10, a light emitter 20, a light receiver 30, and a light shielding member 40. In addition, the light control module 1 includes, as functional components, a transmittance calculator 50 and a light controller 51.

<Liquid Crystal Panel>

The liquid crystal panel 10 adjusts transmittance for incident light. Specifically, liquid crystal panel 10 has a plate shape having the first surface PS1 and the second surface PS2 opposed to the first surface PS1. The first surface PS1 is a surface located on the front side of the light control module 1, and is a surface on a light incident side of the liquid crystal panel 10. The second surface PS2 is a surface located on the rear side of the light control module 1, and is a surface on a side where light is transmitted through in the liquid crystal panel 10.

The liquid crystal panel 10 has a laminated structure in which a plurality of glass substrates and one or a plurality of liquid crystal layers are laminated. The glass substrates are each a substrate formed of transparent glass and each have a flat plate shape. The liquid crystal layer contains liquid crystal molecules. The liquid crystal molecules are molecules that have, for example, a rod shape having a long axis direction and a short axis direction and that change an orientation of the molecules when a voltage is applied. Optical properties of liquid crystal molecules depend on their orientation.

Regarding the liquid crystal panel 10, the liquid crystal layer is sandwiched between the plurality of glass substrates, transparent electrodes are provided on the two glass substrates, which are the outermost layers, and the orientation of liquid crystal molecules of the liquid crystal layer is changed by applying a voltage to the transparent electrodes. This makes it possible to adjust the transmittance for the light incident on the liquid crystal panel 10. In the present embodiment, when a voltage is applied to the transparent electrodes of the liquid crystal panel 10, the long axis direction of the liquid crystal molecules is changed to a direction parallel to the glass substrate. Therefore, a transmittance of the liquid crystal panel 10 decreases as the voltage applied to the transparent electrodes increases, and the transmittance of the liquid crystal panel 10 increases as the voltage applied to the transparent electrode decreases.

The liquid crystal panel 10 is provided with a clear panel 11. The clear panel 11 is formed of, for example, a part of the glass substrate constituting the liquid crystal panel 10. The clear panel 11 is provided on an outer periphery of the liquid crystal panel 10.

The liquid crystal panel 10 is housed in a frame-shaped casing, and an outer peripheral portion of the liquid crystal panel 10, that is, the clear panel 11 is supported by the casing. Therefore, the first surface PS1 of the liquid crystal panel 10 is exposed from the casing on the front side of the light control module 1, and the second surface PS2 of the liquid crystal panel 10 is exposed from the casing on the rear side of the light control module 1.

The light emitter 20 radiates detection light. The light emitter 20 includes a light emitting element 21. As the light emitting element 21, a light emitting diode (LED) or the like can be used, for example. The detection light is light used to detect the transmittance of the liquid crystal panel 10. The light emitting element 21 radiates, for example, visible light as the detection light. The visible light is light having, for example, a wavelength of 350 nm or more and 600 nm or less.

The light emitter 20 includes the light emitting element 21 that radiates a first detection light L1 and a second detection light L2. The first detection light L1 is emitted from the light emitting element 21, is transmitted through the liquid crystal panel 10, and is incident on the light receiver 30. The second detection light L2 is emitted from the light emitting element 21 and is incident on the light receiver 30 without being transmitted through the liquid crystal panel 10. In the present preferred embodiment, the second detection light L2 is emitted from the light emitting element 21, is transmitted through the clear panel 11 and is incident on the light receiver 30.

The light emitter 20 is disposed on the second surface PS2 side of the liquid crystal panel 10. The light emitting element 21 radiates the first detection light L1 toward the second surface PS2 of the liquid crystal panel 10. The first detection light L1 is transmitted through the liquid crystal panel 10 from the second surface PS2 toward the first surface PS1 of the liquid crystal panel 10, and is incident on a first light receiving element 31 of the light receiver 30 to be described later. The light emitting element 21 radiates the second detection light L2 toward the clear panel 11 provided on the outer periphery of the liquid crystal panel 10. The second detection light L2 is transmitted through the clear panel 11 and is incident on a second light receiving element 32 of the light receiver 30. In the present embodiment, the first detection light L1 and the second detection light L2 are incident on the light receiver 30 through the light shielding member 40 to be described later.

The light receiver 30 receives the light radiated from the light emitter 20. The light receiver 30 includes the first light receiving element 31 and the second light receiving element 32. As the first light receiving element 31 and the second light receiving element 32, it is possible to use a photodiode, a phototransistor, or the like, for example.

The first light receiving element 31 receives the first detection light L1 that is part of the detection light radiated from the light emitter 20 and is transmitted through the liquid crystal panel 10. The second light receiving element 32 receives the second detection light L2 that is part of the detection light radiated from the light emitter 20 and is not transmitted through the liquid crystal panel 10. In the present preferred embodiment, the second light receiving element 32 receives the second detection light L2 transmitted through the clear panel 11.

The light receiver 30 is disposed on the first surface PS1 side of the liquid crystal panel 10. The first detection light L1 is transmitted through the liquid crystal panel 10 from the second surface PS2 toward the first surface PS1 of the liquid crystal panel 10, and is incident on the first light receiving element 31.

<Light Shielding Member>

The light shielding member 40 blocks leaked light radiated from the light emitter 20. When viewed from a front surface side of the liquid crystal panel 10 on which light is incident, the light shielding member 40 has openings 41 and 42 respectively provided at portions overlapping the first light receiving element 31 and the second light receiving element 32. The front surface side of the liquid crystal panel 10 on which light is incident means a direction (Y direction) from the first surface PS1 toward the second surface PS2 of the liquid crystal panel 10. In the present embodiment, the light shielding member 40 is formed of, for example, a member having a plate shape. The light shielding member 40 is disposed on the second surface PS2 side of the liquid crystal panel 10.

The first detection light L1 radiated from the light emitter 20 is transmitted through the opening 41 of the light shielding member 40 and is incident on the first light receiving element 31. The second detection light L2 radiated from the light emitter 20 is transmitted through the opening 42 of the light shielding member 40 and is incident on the second light receiving element 32. On the other hand, the leaked light from the light emitter 20 is blocked by the light shielding member 40.

Next, as functional components of the light control module 1, the transmittance calculator 50 and the light controller 51 will be described.

<Transmittance Calculator>

The transmittance calculator 50 calculates a liquid crystal transmittance of the liquid crystal panel 10 on the basis of a first light receiving amount of light received by the first light receiving element 31 and a second light receiving amount of light received by the second light receiving element 32. The first light receiving amount is a light amount of the first detection light L1 transmitted through the liquid crystal panel 10, and the second light receiving amount is a light amount of the second detection light L2 not transmitted through the liquid crystal panel 10 but transmitted through the clear panel 11. The liquid crystal transmittance is a transmittance calculated on the basis of the first light receiving amount and the second light receiving amount. For example, the transmittance calculator 50 corrects the first light receiving amount on the basis of the second light receiving amount, and calculates the liquid crystal transmittance on the basis of the corrected light amount.

It is considered that an output of the light emitting element 21 decreases due to aged deterioration. The second light receiving amount of the second light receiving element 32 is a light amount of the second detection light L2 not transmitted through the liquid crystal panel 10. Therefore, it is possible to cancel a decrease of the output of the light emitting element 21 due to aged deterioration by correcting the first light receiving amount of the first light receiving element 31 by using the second light receiving amount of the second light receiving element 32. This makes it possible to calculate the liquid crystal transmittance more accurately.

<Light Controller>

The light controller 51 controls the transmittance of the liquid crystal panel 10 on the basis of the liquid crystal transmittance calculated by the transmittance calculator 50. For example, the light controller 51 controls the transmittance of the liquid crystal panel 10 on the basis of a set target transmittance and the liquid crystal transmittance. The target transmittance may be a value selected from a plurality of preset setting values, or may be a value selected from a predetermined numerical range. For example, when a setting of the transmittance of the liquid crystal panel 10 can be changed in a range of 1% or more to 25% or less, the target transmittance may be a value selected from the range of 1% or more to 25% or less. The target transmittance may be set by a user or may be automatically set depending on a predetermined condition.

Comparing the target transmittance with the liquid crystal transmittance, the light controller 51 controls the transmittance of the liquid crystal panel 10 such that the liquid crystal transmittance is equal to the target transmittance. In the present preferred embodiment, the light controller 51 controls the transmittance of the liquid crystal panel 10 by controlling the voltage applied to the liquid crystal panel 10. In the present preferred embodiment, the light controller 51 decreases the voltage applied to the liquid crystal panel 10 in order to increase the transmittance, and increases the voltage applied to the liquid crystal panel 10 in order to decrease the transmittance.

The transmittance calculator 50 and the light controller 51 can be realized by an electronic circuit. The transmittance calculator 50 and the light controller 51 can be configured with, for example, a microcomputer, a central processing unit (CPU), a micro processing unit (MPU), a graphic processing unit (GPU), a digital signal processor (DSP), a field programmable gate array (FPGA), or an application specific integrated circuit (ASIC). Functions of the transmittance calculator 50 and the light controller 51 may be configured only with hardware or may be realized by combining hardware and software. The transmittance calculator 50 and the light controller 51 realize a predetermined function by reading data and a program stored in a storage such as a memory and performing various kinds of arithmetic processing.

As described above, in the light control module 1, the liquid crystal transmittance is calculated, and feedback control is performed on the basis of the calculated liquid crystal transmittance and the target transmittance, so that the liquid crystal transmittance is adjusted to an optimum liquid crystal transmittance. For example, in the light control module 1, even if the liquid crystal transmittance fluctuates due to a change with time or the like, the liquid crystal transmittance can be adjusted to the target transmittance accurately.

<Control Device>

The control device 2 controls the light control module 1. In the present embodiment, the control device 2 also controls the imaging element 3. As illustrated in FIG. 1, the control device 2 includes a processor 60 and a storage medium 61 that stores an instruction to be executed by the processor 60.

The processor 60 executes instructions executable by a computer. The processor 60 executes instructions stored in the storage medium 61.

The storage medium 61 stores instructions executable by a computer. Specifically, the storage medium 61 stores data and a program. The storage medium 61 includes, for example, a random-access memory (RAM), a read-only memory (ROM), an electrically erasable programmable read-only memory (EEPROM), a flash memory, or another memory technology, a compact disc read only memory (CD-ROM), a digital versatile disc (DVD), or another optical disk storage, a magnetic cassette, a magnetic tape, a magnetic disk storage, or another magnetic storage device, or any medium that can be used to store desired information and that can be accessed by the control device 2.

The control device 2 can be realized by an electronic circuit. The control device 2 can be configured with, for example, a microcomputer, a CPU, an MPU, a GPU, a DSP, an FPGA, or an ASIC. A function of the control device 2 may be configured only by hardware, or may be realized by combining hardware and software. The control device 2 realizes a predetermined function by reading data and a program stored in the storage medium 61 and performing various kinds of arithmetic processing.

<Imaging Element>

The imaging element 3 images imaging light. As illustrated in FIG. 2, the imaging element 3 detects the imaging light Ls transmitted through the light control module 1 to acquire an imaging signal. The imaging element 3 is an image sensor such as a charge-coupled device (CCD) or a complementary metal-oxide semiconductor (CMOS).

The imaging element 3 is disposed on the rear side of the light control module 1, that is, on the second surface PS2 side of the light control module 1. The imaging element 3 detects the imaging light Ls transmitted through the liquid crystal panel 10 from the first surface PS1 toward the second surface PS2 of liquid crystal panel 10.

In the present embodiment, the imaging element 3 is controlled by the control device 2.

[Control Method]

<One example of Control Method in Still Image Shooting>

Figure 3:
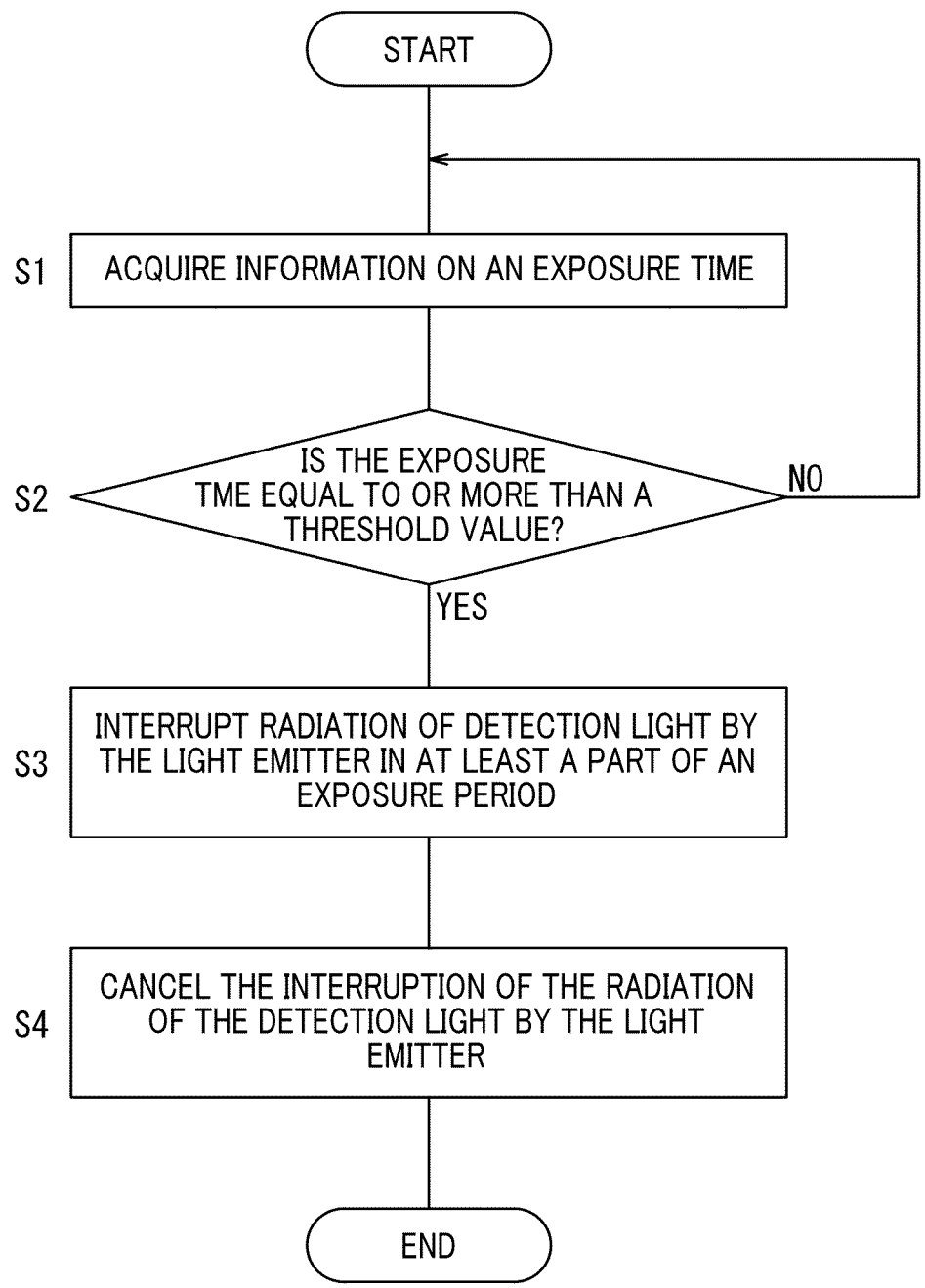
FIG. 3 is a flowchart of a control method according to the first embodiment of the present disclosure in still image shooting.

A control method according to the first embodiment of the present disclosure in still image shooting will be described with reference to FIG. 3. FIG. 3 is a flowchart of the control method according to the first embodiment of the present disclosure in still image shooting. FIG. 3 is a flowchart of a control method for controlling the light control module 1 including the light emitter 20 that radiates the detection lights L1 and L2. The control method is performed by the control device 2.

As illustrated in FIG. 3, in step S1, the control device 2 acquires information on an exposure time in still image shooting. For example, the control device 2 acquires setting information on the exposure time when a still image is captured by the imaging device 100. The setting information on the exposure time is stored in the storage of the imaging device 100. For example, the setting information on the exposure time may be setting information entered by a user, or may be setting information automatically set by the imaging device 100.

In step S2, the control device 2 determines whether to interrupt or not to interrupt radiation of the detection lights L1 and L2 by the light emitter 20 on the basis of the information on the exposure time in still image shooting and a threshold value. Specifically, the control device 2 determines whether or not the exposure time when a still image is captured is equal to or more than a threshold value. For example, the threshold value is set to 0.1 seconds. That is, the control device 2 determines whether or not the exposure time for still image shooting is equal to or more than 0.1 seconds. Note that the threshold value is not limited to 0.1 seconds. The threshold value may be 0.1 seconds or more. For example, the threshold value may be set to 1 second or more, or may be set to 2 seconds or more.

In a case where the exposure time is equal to or more than the threshold value, a control flow proceeds to step S3. If the exposure time is smaller than the threshold value, the control flow returns to step S1.

In step S3, the control device 2 interrupts the radiation of the detection lights L1 and L2 by the light emitter 20 in at least a part of an exposure period in which exposure is performed. For example, the control device 2 interrupts the radiation of the detection lights L1 and L2 by the light emitter 20 from a start to an end of the exposure period. The expression "interrupting the radiation of the detection lights L1 and L2 by the light emitter 20" means that the detection lights L1 and L2 are placed in a state of not being radiated from the light emitter 20. For example, the control device 2 may turn off the light emitter 20, or may close, with a lid, emission ports of the light emitter 20 through which the detection lights L1 and L2 are emitted.

In the light control module 1, there is a case where the detection lights L1 and L2 radiated from the light emitter 20 may be reflected by the liquid crystal panel 10 and may be incident on the imaging element 3 as leaked light. In this case, if the exposure time is long when a still image is captured, leaked light is imaged on the still image to be captured. For example, in a case where the exposure time is set to two seconds or more, leaked light enters the imaging element 3 and is imaged on the still image. To address this issue, the radiation of the detection lights L1 and L2 by the light emitter 20 is interrupted in the exposure period in which exposure is performed for capturing a still image, so that it is possible to prevent or reduce the leaked light being incident on the imaging element 3. This makes it possible to prevent or reduce the leaked light imaged on a captured still image.

Figure 4:
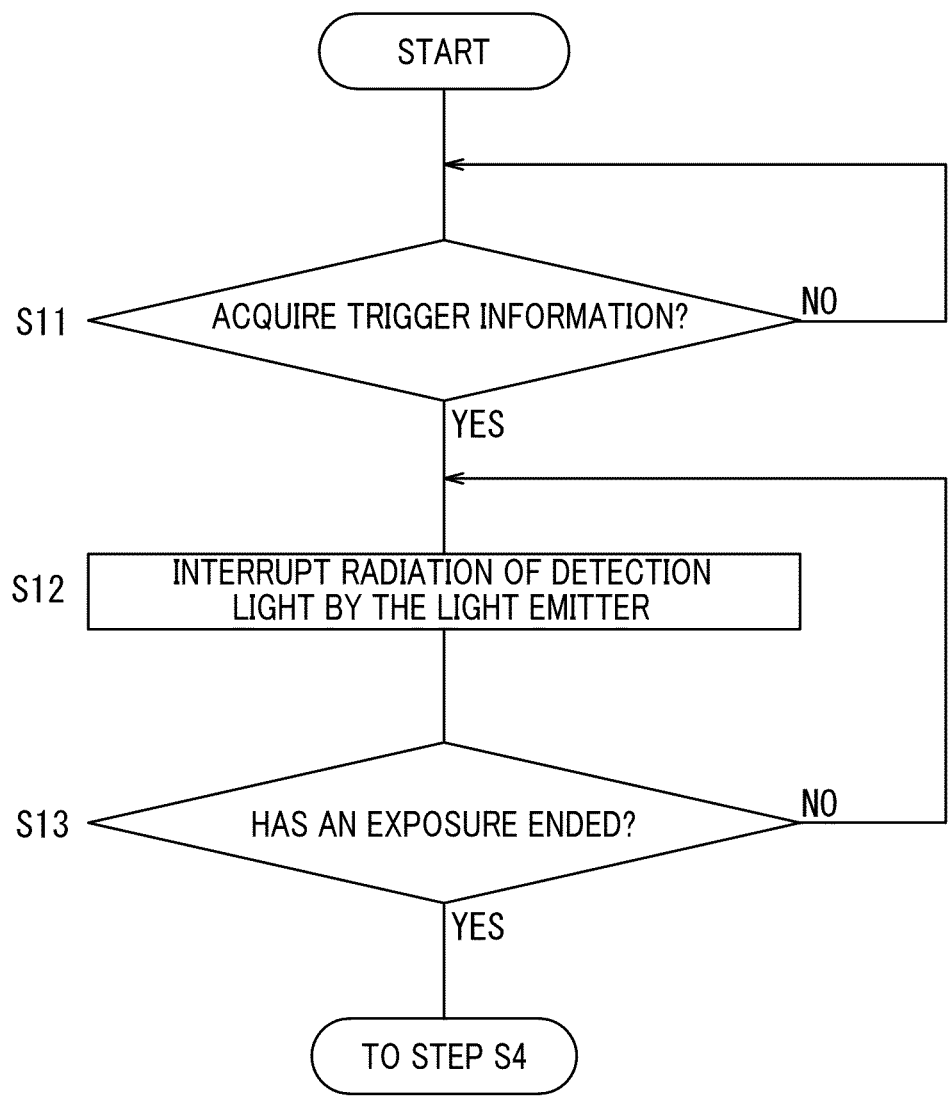
FIG. 4 is a detailed flowchart of a step of interrupting radiation of detection light.

Step S3 will be described in detail with reference to FIG. 4. FIG. 4 is an example of a detailed flowchart of the step of interrupting the radiation of the detection light.

As illustrated in FIG. 4, in step S11, the control device 2 acquires trigger information related to start of exposure. Specifically, the control device 2 determines whether or not the trigger information related to the start of exposure is acquired.

The trigger information related to the start of exposure is trigger information related to start of still image shooting, and includes, for example, at least one of a still image shooting start signal, an autofocus start signal, or an external signal from an external device.

The still image shooting start signal is a signal to start still image shooting. The still image shooting start signal may be an input signal to be entered by a user to start still image shooting, or may be a signal automatically generated by the imaging device 100 to start still image shooting. For example, the still image shooting start signal may be generated by the user pressing an imaging button of the imaging device 100 to start still image shooting, or may be automatically generated by the imaging device 100 to start still image shooting at a timing at which a timer set by the user has elapsed.

The autofocus start signal is a signal for starting a function of automatically adjusting focusing. For example, the autofocus start signal may be generated by the user half-pressing the imaging button of the imaging device 100 to start autofocus, or may be automatically generated by the imaging device 100.

The external signal from an external device is a signal from an external device connected to the imaging device 100 via a wired network or a wireless network. The external device is a device that externally controls the imaging device 100, and includes, for example, a personal computer (PC), a smartphone, a tablet terminal, a television, a remote controller, or a sensor. The external signal is a signal for controlling the imaging device 100, and includes, for example, a signal for causing the imaging device 100 to start still image shooting or a signal for causing the imaging device 100 to start autofocus. When the external device is a sensor, the external signal may be a detection signal generated by the sensor. For example, when the external device is a motion sensor, the external signal may be a detection signal generated when a motion of a subject is detected by the motion sensor.

In step S12, the control device 2 interrupts the radiation of the detection lights L1 and L2 by the light emitter 20. The control device 2 interrupts, in step S11, the radiation of the detection lights L1 and L2 by the light emitter 20 on the basis of the trigger information. For example, the control device 2 interrupts the radiation of the detection lights L1 and L2 by the light emitter 20 at a timing at which the trigger information is acquired. Alternatively, the control device 2 interrupts the radiation of the detection lights L1 and L2 by the light emitter 20 after a predetermined time has elapsed from the timing at which the trigger information is acquired.

In step S13, the control device 2 determines whether or not the exposure has ended. For example, the control device 2 determines whether or not a predetermined time has elapsed from the radiation of the detection lights L1 and L2 by the light emitter 20 was interrupted. For example, the predetermined time may be the same as the exposure time acquired in step S1. Alternatively, the predetermined time may be shorter or longer than the exposure time in accordance with the timing of interrupting the radiation of the detection lights L1 and L2 by the light emitter 20.

If the exposure has ended, the control flow proceeds to step S4. If the exposure has not ended, the control flow returns to step S12.

With reference again to FIG. 3, in step S4, the control device 2 cancels the interruption of the radiation of the detection lights L1 and L2 by the light emitter 20. The expression "canceling the interruption of the radiation of the detection lights L1 and L2 by the light emitter 20" means to place the detection lights L1 and L2 in a state capable of being radiated from the light emitter 20. For example, the control device 2 turns the light emitter 20 from off to on.

As described above, with steps S1 to S4 being performed by the control device 2, it is possible to prevent or reduce the leaked light from the light emitter 20 being incident on the imaging element 3 in still image shooting in which a long-time exposure of two seconds or more is performed, for example.

In the example described above, the above-mentioned control method in still image shooting includes steps S1 to S4, but the control method is not limited thereto. The control method may include step S3, and steps S1, S2, and S4 are not essential constituent elements.

Figure 5:
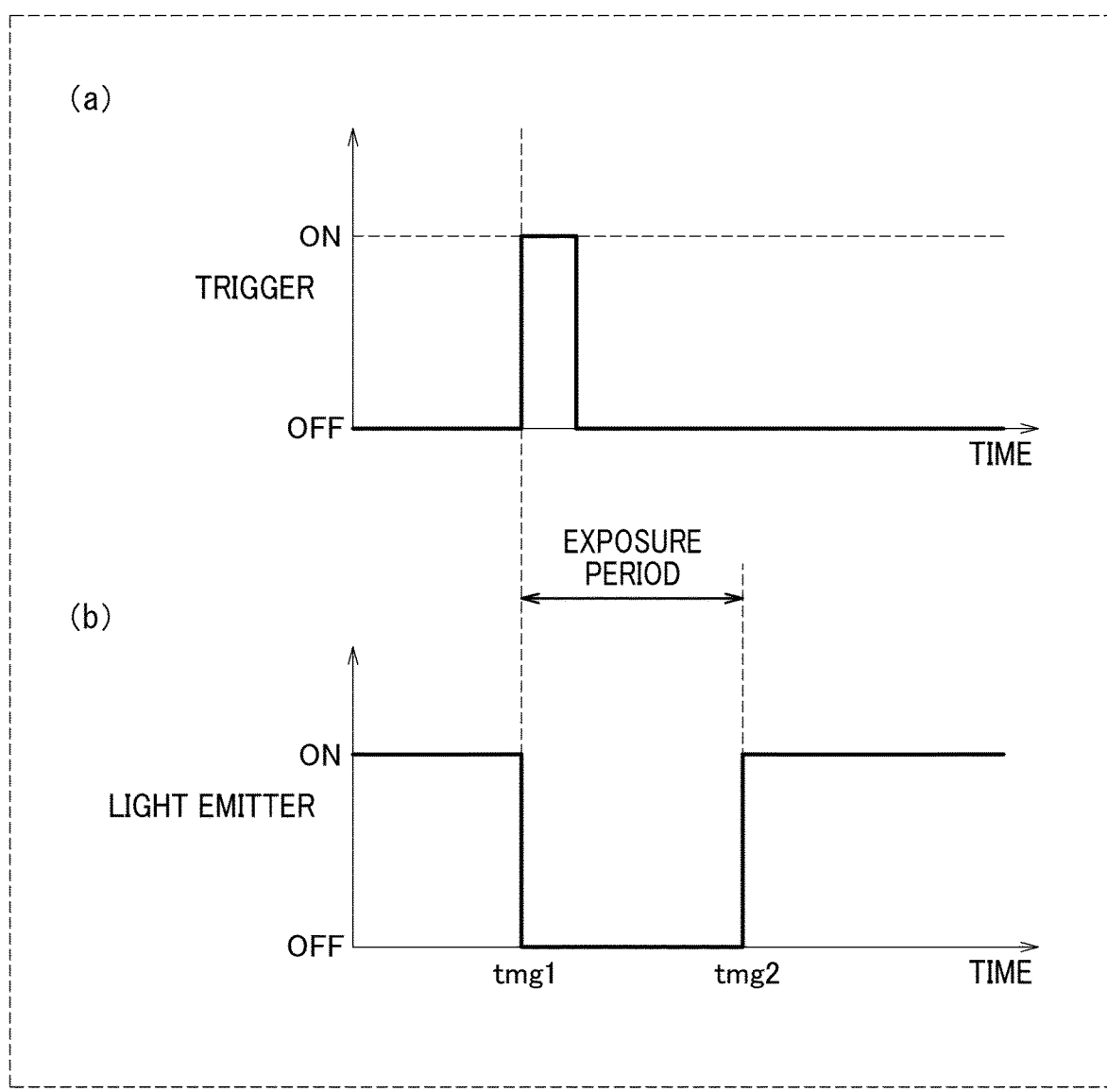
FIG. 5 is a timing chart of the control method according to the first embodiment of the present disclosure in still image shooting.

FIG. 5 is a timing chart of the control method according to the first embodiment of the present disclosure. Note that, in an example illustrated in FIG. 5, the trigger information is the still image shooting start signal.

As illustrated in FIG. 5, the control device 2 turns the light emitter 20 from on to off at a first timing tmg1 at which the trigger information is acquired. As a result, the radiation of the detection lights L1 and L2 is interrupted at a timing of start of still image shooting, that is, at a timing of start of exposure.

The control device 2 keeps the light emitter 20 in the off state for a predetermined time from the first timing tmg1. The predetermined time is the same as the exposure time set for still image shooting. As a result, the radiation of the detection lights L1 and L2 is interrupted during the exposure period in which exposure is performed in still image shooting.

The control device 2 turns the light emitter 20 from off to on at a second timing tmg2 at which a predetermined time has elapsed from the first timing tmg1. As a result, the interruption of the radiation of the detection lights L1 and L2 is cancelled at a timing at which the exposure is ended, and the detection lights L1 and L2 are radiated from the light emitter 20.

<One Example of Control Method in Moving Image Shooting>

Figure 6:
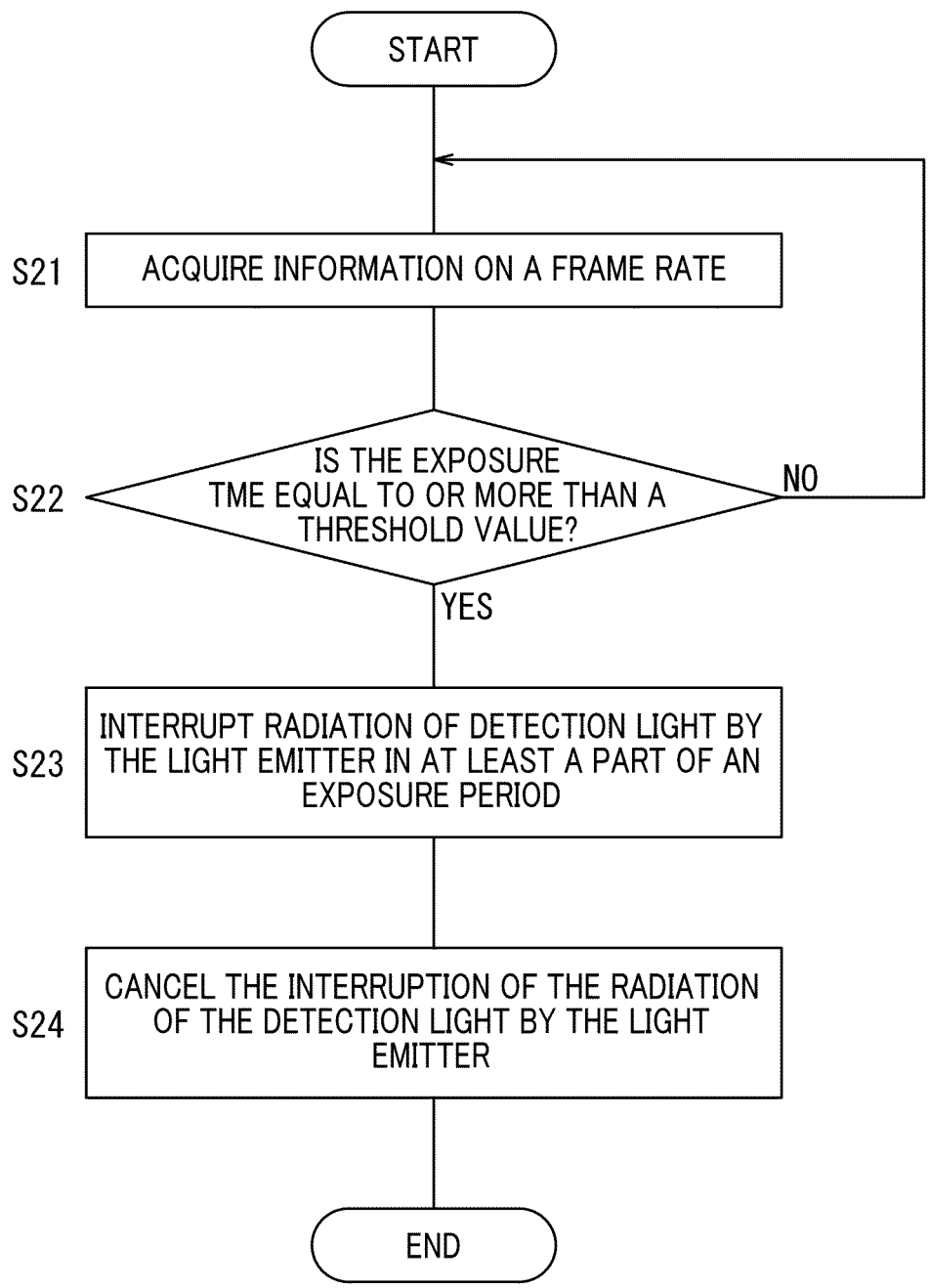
FIG. 6 is a flowchart of another example of the control method according to the first embodiment of the present disclosure in moving image shooting.

There will be described a control method, in moving image shooting, according to the first embodiment of the present disclosure with reference to FIG. 6. FIG. 6 is a flowchart of a control method according to the first embodiment of the present disclosure in moving image shooting. FIG. 6 is the flowchart of the control method for controlling the light control module 1 including the light emitter 20 that emits the detection lights L1 and L2. The control method is performed by the control device 2.

As illustrated in FIG. 6, in step S21, the control device 2 acquires information on a frame rate as information on an exposure time in moving image shooting. For example, the control device 2 acquires setting information on a frame rate when a moving image is captured by the imaging device 100. The setting information on the frame rate is stored in the storage of the imaging device 100. For example, the setting information on the frame rate may be setting information entered by a user, or may be setting information automatically set by the imaging device 100. For example, the control device 2 calculates the exposure time in moving image shooting on the basis of the acquired information on the frame rate.

In step S22, the control device 2 determines whether to interrupt or not to interrupt the radiation of the detection lights L1 and L2 by the light emitter 20 on the basis of the information on the exposure time in moving image shooting and a threshold value. Specifically, the control device 2 determines whether or not the exposure time in moving image shooting is equal to or more than the threshold value. For example, the threshold value is set to an exposure time for 60 fps. Note that the threshold value is not limited to the exposure time corresponding to 60 fps. The threshold value may be an exposure time corresponding to 60 fps or less. For example, the threshold value may be an exposure time corresponding to 30 fps or less, or may be an exposure time corresponding to 1 fps or less.

If the exposure time is equal to or more than the threshold value, the control flow proceeds to step S23. If the frame rate is smaller than the threshold value, the control flow returns to step S21.

In step S23, the control device 2 interrupts the radiation of the detection lights L1 and L2 by the light emitter 20 in at least a part of an exposure period in which exposure is performed. For example, the control device 2 interrupts the radiation of the detection lights L1 and L2 by the light emitter 20 from start to end of moving image shooting.

The control device 2 interrupts the radiation of the detection lights L1 and L2 by the light emitter 20 on the basis of the trigger information in a similar manner to step S3 of the control method in still image shooting. In the control method in moving image shooting, the trigger information related to the start of exposure is trigger information related to start of moving image shooting, and includes, for example, a moving image shooting start signal or an external signal from an external device.

The moving image shooting start signal is a signal to start moving image shooting. The moving image shooting start signal may be an input signal to be entered by a user to start moving image shooting, or may be a signal automatically generated by the imaging device 100 to start moving image shooting. For example, the moving image shooting start signal may be generated by the user pressing the imaging button of the imaging device 100 to start moving image shooting, or may be automatically generated by the imaging device 100 to start moving image shooting at a timing at which a timer set by the user has elapsed.

The external signal from an external device is a signal for controlling the imaging device 100, and includes, for example, a signal for causing the imaging device 100 to start moving image shooting. When the external device is a sensor, the external signal may be a detection signal generated by the sensor.

In addition, the control device 2 determines whether or not the exposure is ended. That is, the control device 2 determines whether or not the moving image shooting is ended. For example, the control device 2 acquires trigger information related to end of exposure. That is, the control device 2 determines whether or not the trigger information related to end of the exposure is acquired.

The trigger related to the end of exposure is trigger information related to the end of the moving image shooting, and includes, for example, a moving image shooting end signal or an external signal from an external device. The moving image shooting end signal is a signal to end moving image shooting. The moving image shooting end signal may be an input signal to be entered by the user to end moving image shooting, or may be a signal automatically generated by the imaging device 100 to end moving image shooting. For example, the moving image shooting end signal may be generated by the user pressing the imaging button of the imaging device 100 to end the moving image shooting, or may be automatically generated by the imaging device 100 to end moving image shooting at a timing at which a timer set by the user has elapsed.

The external signal from the external device includes, for example, a signal for causing the imaging device 100 to end moving image shooting. When the external device is a sensor, the external signal may be a detection signal generated by the sensor. For example, when the external device is a motion sensor, the external signal may be a detection signal generated when a motion of a subject is not detected by the motion sensor.

If the moving image shooting is ended, the control flow proceeds to step S24. If the moving image shooting is not ended, the control device 2 continues interrupting the radiation of the detection lights L1 and L2 by the light emitter 20.

With reference again to FIG. 6, in step S24, the control device 2 cancels the interruption of the radiation of the detection lights L1 and L2 by the light emitter 20 in a similar manner to step S4 of the control method in still image shooting.

As described above, with steps S21 to S24 being performed by the control device 2, it is possible to prevent or reduce the leaked light from the light emitter 20 being incident on the imaging element 3 when moving image shooting is performed at the frame rate of 1 fps or more.

In the example described above, the above-mentioned control method in moving image shooting includes steps S21 to S24, but the control method is not limited thereto. The control method may include step S23, and steps S21, S22, and S24 are not essential constituent elements.

Figure 7:
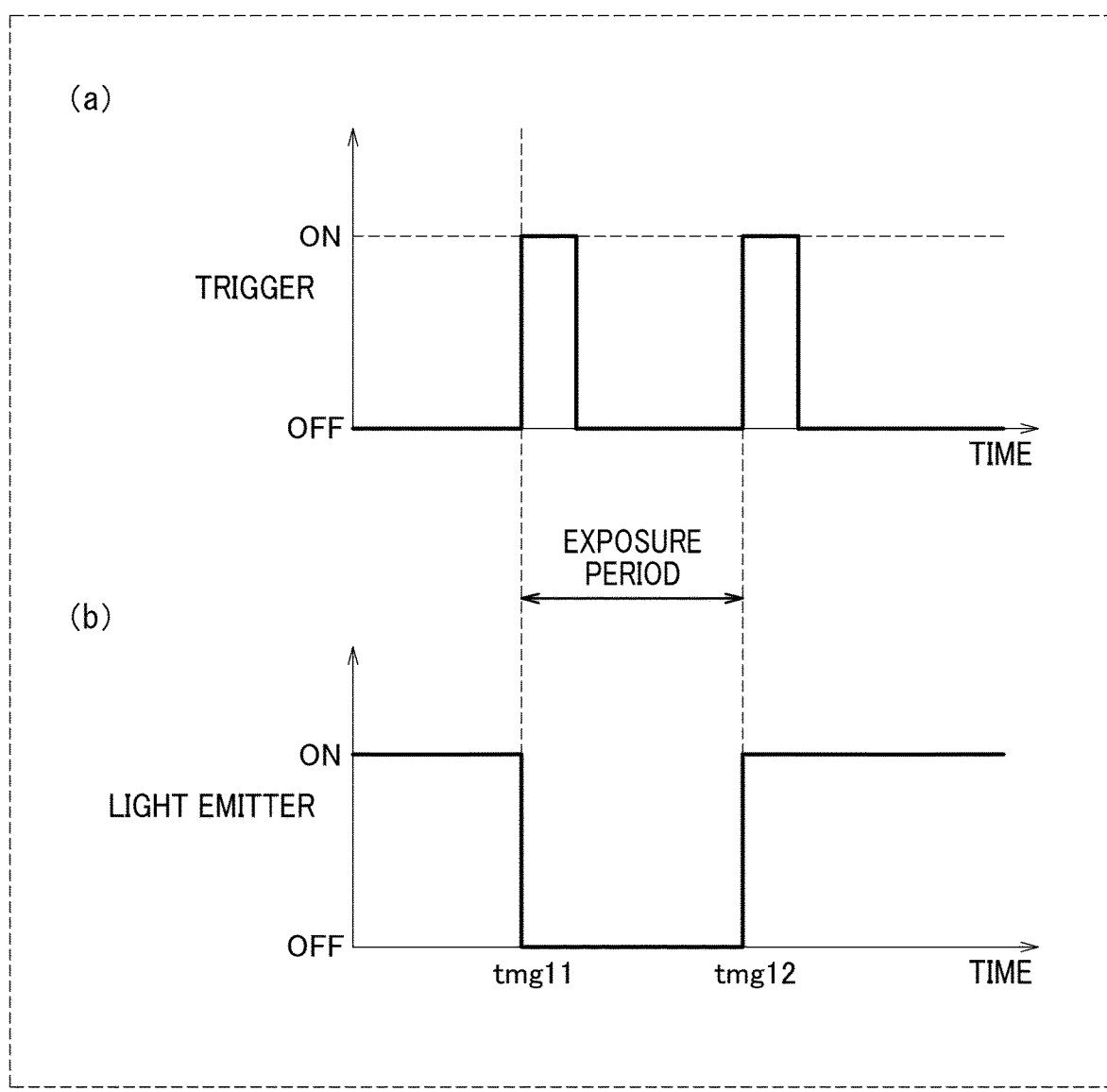
FIG. 7 is a timing chart of another example of the control method according to the first embodiment of the present disclosure in moving image shooting.

FIG. 7 is a timing chart of the control method according to the first embodiment of the present disclosure in moving image shooting. Note that, in the example illustrated in FIG. 7, the trigger information includes a moving image shooting start signal and a moving image shooting end signal.

As illustrated in FIG. 7, the control device 2 turns the light emitter 20 from on to off at a first timing tmg11 at which a moving image shooting start signal is acquired. This operation interrupts the radiation of the detection lights L1 and L2 at a timing of start of moving image shooting, that is, a timing of start of exposure.

The control device 2 turns the light emitter 20 from off to on at a second timing tmg12 at which a moving image shooting end signal is acquired. As a result, the interruption of the radiation of the detection lights L1 and L2 is cancelled at a timing at which the exposure is ended, and the detection lights L1 and L2 are radiated from the light emitter 20.

In the present preferred embodiment, while the radiation of the detection lights L1 and L2 by the light emitter 20 is interrupted, the light control module 1 is performing feedback control on the basis of the liquid crystal transmittance calculated immediately before the radiation of the detection lights L1 and L2 is interrupted.

Advantageous Effects

The control method, the control device, and the imaging device according to the first embodiment of the present disclosure can achieve the following advantageous effects.

The control method of the present disclosure is a control method for controlling the light control module 1 including the light emitter 20 that radiates the detection lights L1 and L2. The control method includes steps S3 and S23, which interrupt radiation of the detection lights L1 and L2 by the light emitter 20 in at least a part of an exposure period in which exposure is performed in still image shooting or moving image shooting.

With such a configuration, leaked light can be reduced. For example, some of the detection lights L1 and L2 radiated from the light emitter 20 may be reflected by the liquid crystal panel 10 or the like and become leaked light. When the leaked light enters the imaging element 3, the leaked light may be imaged on a still image or a moving image. According to the control method of the present disclosure, the radiation of the detection lights L1 and L2 by the light emitter 20 is interrupted in at least a part of an exposure period in which exposure is performed in still image shooting or moving image shooting. This operation makes it possible to reduce the leaked light incident on the imaging element 3. As a result, it is possible to prevent or reduce the leaked light being imaged on a still image or a moving image, and it is therefore possible to improve quality of the still image and the moving image to be captured.

Furthermore, steps S3 and S23, which interrupt the radiation of the detection light L1 and L2 of the light emitter 20, include step S11 for acquiring trigger information related to start of exposure and step S12 for interrupting the radiation of the detection lights L1 and L2 by the light emitter 20 on the basis of the trigger information. Such a configuration makes it possible to interrupt the radiation of the detection lights L1 and L2 by the light emitter 20 on the basis of the timing at which exposure is started. As a result, it is possible to reliably reduce leaked light at the time of still image shooting or moving image shooting.

The trigger information related to the start of exposure includes at least one of a still image shooting start signal, an autofocus start signal, a moving image shooting start signal, or an external signal from an external device. Such a configuration makes it possible to interrupt the radiation of the detection lights L1 and L2 by the light emitter 20 at an appropriate timing in still image shooting or moving image shooting. This makes it possible to more reliably reduce leaked light during still image shooting or moving image shooting.

In addition, in step S12, which interrupts the radiation of the detection lights L1 and L2 by the light emitter 20 on the basis of the trigger information, interrupts the radiation of the detection lights L1 and L2 by the light emitter 20 at a timing at which the trigger information is acquired. Such a configuration makes it possible to interrupt the radiation of the detection lights L1 and L2 by the light emitter 20 at a timing of start of exposure or near the timing of start of exposure. This makes it possible to more reliably reduce leaked light during still image shooting or moving image shooting.

Furthermore, the control method of the present disclosure includes steps S1 and S21, which acquire information on an exposure time of still image shooting or moving image shooting, and includes steps S2 and S22, which determine whether to interrupt or not to interrupt the radiation of the detection lights L1 and L2 by the light emitter 20 on the basis of the exposure time and a threshold value. This configuration makes it possible to efficiently perform control on the basis of such an exposure time that the leaked light affects in still image shooting or moving image shooting.

Furthermore, the control method of the present disclosure includes steps S4 and S24, which cancel the interruption of the radiation of the detection lights L1 and L2 by the light emitter 20 at a timing at which the exposure is ended. Such a configuration makes it possible to perform the radiation of the detection lights L1 and L2 by the light emitter 20 after the exposure is ended, for example, after still image shooting or moving image shooting is ended. As a result, feedback control of the light control module 1 can be performed after the exposure is ended.

The detection lights L1 and L2 emitted from the light emitter 20 are visible light. Since the visible light has a large detection range of transmittance, the transmittance can be detected more accurately. On the other hand, when visible light enters the imaging element 3 as leaked light, the visible light is more likely to be imaged as a noise on a captured still image or moving image as compared with light in a wavelength of, for example, infrared light. By the control method of the present disclosure, it is difficult for leaked light to enter the imaging element 3 during still image shooting or moving image shooting, so that the control method is very useful when visible light is used as the detection lights L1 and L2.

The control device 2 and the imaging device 100 of the present disclosure can achieve effects similar to the effects of the above-described control method.

Note that the light control module to which the control method of the present disclosure can be applied is not limited to the light control module 1 described in the present preferred embodiment. The control method of the present disclosure is applicable to any light control module if the control module includes a light emitter that radiates detection light.

In the present embodiment, in the light control module 1, the light shielding member 40, the transmittance calculator 50, and the light controller 51 are not essential components. The light control module 1 does not have to include the light shielding member 40, the transmittance calculator 50, or the light controller 51. For example, the following configuration is possible. The control device 2 includes the transmittance calculator 50 and the light controller 51, and the light control module 1 transmits, to the control device 2, information on the light receiving amounts acquired by the light receiver 30.

The present embodiment has described an example in which the transmittance calculator 50, the light controller 51, and the control device 2 are separate elements; however, the present disclosure is not limited to the example. For example, one or a plurality of elements of the transmittance calculator 50, the light controller 51, and the control device 2 may be integrated or further divided.

The present embodiment has described an example in which the detection light is visible light, but the present disclosure is not limited to the example. For example, the detection light may be infrared light, ultraviolet light, or the like.

The present embodiment has described an example in which the control device 2 calculates, in step S21, the exposure time in moving image shooting on the basis of a frame rate, but the present disclosure is not limited to the example. For example, the control device 2 does not have to calculate the exposure time in moving image shooting on the basis of a frame rate. In this case, in step S22, the control device 2 may make a determination by using a threshold value of a frame rate. For example, the control device 2 may determine whether or not the frame rate acquired in step S21 is the threshold value or less. For example, the threshold value of the frame rate may be 60 fps or less. Alternatively, the threshold value of the frame rate may be 30 fps or less or 1 fps or less.

The present embodiment has described an example in which the imaging device 100 includes the control device 2, but the present disclosure is not limited to the example. The control device 2 does not have to be included in the components of the imaging device 100.

Hereinafter, a modified example of the light control module 1 according to the first embodiment of the present disclosure will be described.

First Modified Example

Figure 8:
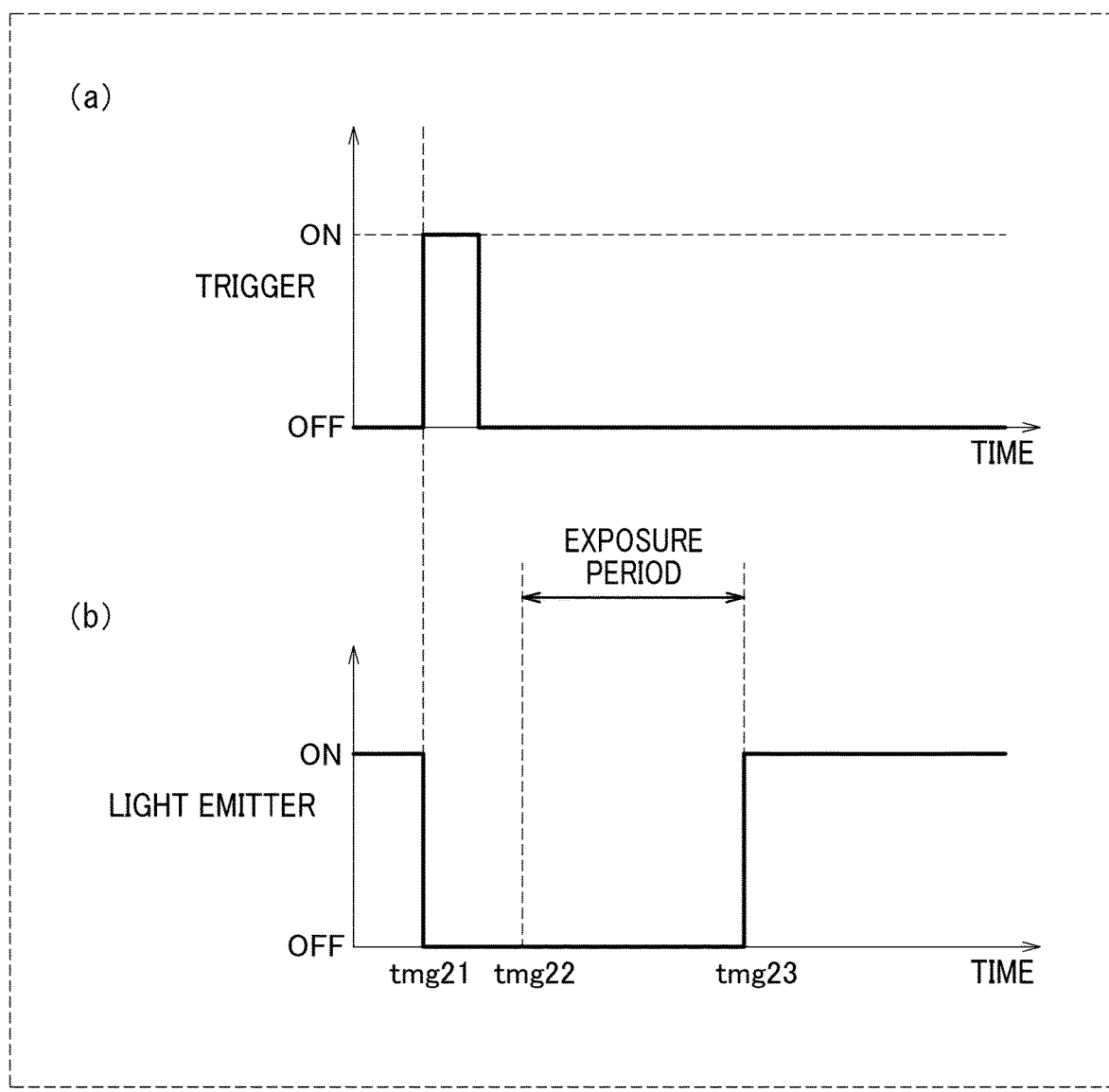
FIG. 8 is a timing chart of a control method according to a first modified example.

FIG. 8 is a timing chart of a control method according to the first modified example. In the example illustrated in FIG. 8, the trigger information related to the start of exposure is an autofocus start signal. In addition, a time during which the light emitter 20 is turned off is longer than the exposure period.

As illustrated in FIG. 8, the control device 2 may turn off the light emitter 20 at a first timing tmg21 at which an autofocus start signal, which is prior to the start of exposure, is acquired.

By acquiring a still image shooting start signal, the control device 2 obtains a second timing tmg22 at which the exposure is started. The control device 2 may turn on the light emitter 20 at a third timing tmg23 at which a predetermined time, to be specific, the exposure time set for still image shooting has elapsed from the second timing tmg22.

Such a configuration enables the light emitter 20 to be reliably turned off at the time of start of exposure.

Second Modified Example

Figure 9:
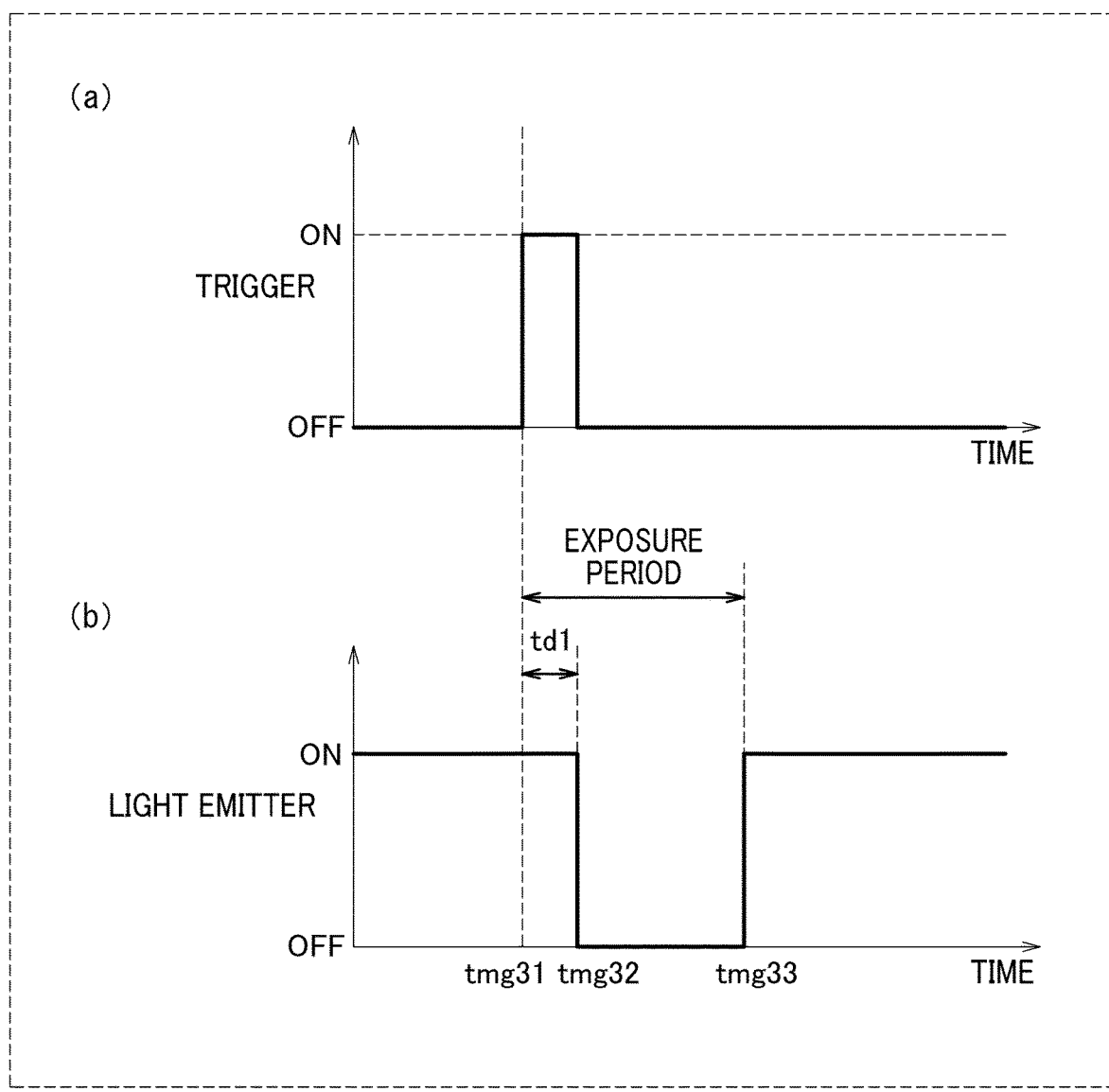
FIG. 9 is a timing chart of a control method according to a second modified example.

FIG. 9 is a timing chart of a control method of a second modified example. In the example illustrated in FIG. 9, the control device 2 turns off the light emitter 20 after a predetermined time has elapsed from acquiring a still image shooting start signal. In addition, a time during which the light emitter 20 is turned off is shorter than an exposure period.

As illustrated in FIG. 9, when the control device 2 acquires the trigger information, the control device 2 may turn off the light emitter 20 at a second timing tmg32 at which a predetermined time td1 has elapsed from a first timing tmg31 at which the control device 2 acquires the trigger information. The predetermined time td1 is set within such a range that leaked light does not affect. Furthermore, the control device 2 may turn on the light emitter 20 at a third timing tmg33 at which the exposure time set for still image shooting has elapsed from the first timing tmg31.

As described above, a timing at which the light emitter 20 is turned off may be shifted from the first timing tmg31, at which the trigger information is acquired, within such a range that leaked light does not affect. As a result, the time during which the light emitter 20 is turned off can be shortened.

Note that the first and second modified examples are examples of the operation in which the light emitter 20 is turned off on the basis of the trigger information, but the present disclosure is not limited to these examples. For example, in the second modified example, the control device 2 may turn off the light emitter 20 at a timing at which the predetermined time td1 has elapsed from the timing at which the autofocus start signal was acquired.

Third Modified Example

Figure 10:
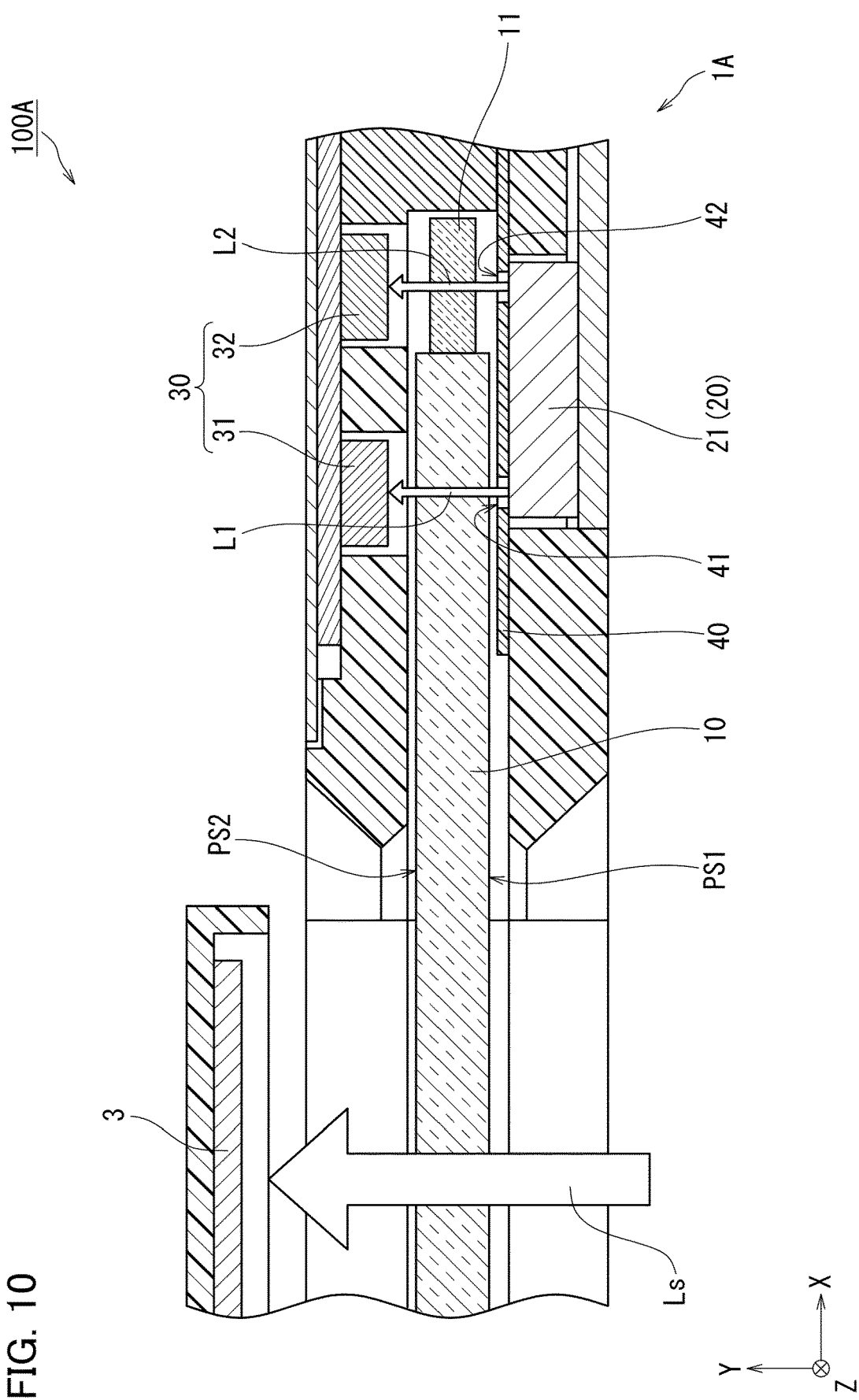
FIG. 10 is a schematic partial cross-sectional view illustrating a main configuration of an imaging device of a third modified example.

FIG. 10 is a schematic partial cross-sectional view illustrating a main configuration of an imaging device of a third modified example. In an imaging device 100A illustrated in FIG. 10, the positions where the light emitter 20 and the light receiver 30 are disposed are reversed with respect to the imaging device 100 of the first embodiment.

As illustrated in FIG. 10, in the light control module 1A of the imaging device 100A, the light emitter 20 is disposed on the first surface PS1 side of the liquid crystal panel 10, and the light receiver 30 and the imaging element 3 are disposed on the second surface PS2 side of the liquid crystal panel 10. The first detection light L1 is transmitted through the liquid crystal panel 10 from the first surface PS1 toward the second surface PS2 of the liquid crystal panel 10, and is incident on the first light receiving element 31.

As described above, in the light control module 1A, the light emitter 20 is disposed on the opposite side of the imaging element 3 with the liquid crystal panel 10 interposed therebetween. As a result, even if the detection light L1 radiated from the light emitter 20 is reflected by the liquid crystal panel 10 and becomes leaked light, the leaked light is less likely to be incident on the imaging element 3.

In the above, the embodiment has been described as an example of techniques in the present disclosure. For that purpose, the drawings and the detailed description are provided. Therefore, the components illustrated in the drawings and described in the detailed description may include, to exemplify the above-described techniques, not only components essential for solving the issue but also components not essential for solving the issue. For this reason, it should not be immediately recognized that those unnecessary components are necessary only because those unnecessary components are described in the drawings or the detailed description.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

The control method of the present disclosure is applicable to an imaging device or the like that includes a light control module such as an electronic ND filter.

The invention claimed is:

1. A control method for controlling a light control module including a light emitter that radiates detection light, the control method comprising:
   interrupting radiation of the detection light by the light emitter in at least part of an exposure period in which exposure is being performed in still image shooting or moving image shooting;
   acquiring information on an exposure time for still image shooting or moving image shooting; and
   determining whether to interrupt or not to interrupt the radiation of the detection light by the light emitter, based on the information on the exposure time and a threshold value,
   wherein the threshold value includes at least one of a first threshold value for still image shooting being 0.1 seconds or more or a second threshold for moving image shooting value being an exposure time of 60 fps or less.

2. The control method according to claim 1, wherein the interrupting radiation of the detection light by the light emitter includes:
   acquiring trigger information related to start of exposure; and
   interrupting, based on the trigger information, the radiation of the detection light by the light emitter.

3. The control method according to claim 2, wherein the trigger information related to the start of exposure includes: at least one of a still image shooting start signal, an autofocus start signal, a moving image shooting start signal, or an external signal from an external device.

4. The control method according to claim 2, wherein the interrupting, based on the trigger information, the radiation of the detection light by the light emitter includes: interrupting the radiation of the detection light by the light emitter at a timing at which the trigger information is acquired.

5. The control method according to claim 2, wherein the interrupting, based on the trigger information, the radiation of the detection light by the light emitter includes: interrupting the radiation of the detection light by the light emitter after a predetermined time has elapsed from a timing at which the trigger information is acquired.

6. The control method according to claim 1, further comprising:
canceling the interruption of the radiation of the detection light by the light emitter at a timing at which the exposure is ended.

7. The control method according to claim 1, wherein the detection light is visible light.

8. A control device that controls a light control module including a light emitter that radiates detection light, the control device comprising:
a processor; and
a storage medium storing an instruction to be executed by the processor,
wherein the instruction includes:
interrupting radiation of the detection light by the light emitter in at least part of an exposure period in which exposure is being performed in still image shooting or moving image shooting;
acquiring information on an exposure time for still image shooting or moving image shooting; and
determining whether to interrupt or not to interrupt the radiation of the detection light by the light emitter, based on the information on the exposure time and a threshold value,
wherein the threshold value includes at least one of a first threshold value for still image shooting being 0.1 seconds or more or a second threshold for moving image shooting value being an exposure time of 60 fps or less.

9. The control device according to claim 8, wherein the interrupting radiation of the detection light by the light emitter includes:
acquiring trigger information related to start of exposure; and
interrupting, based on the trigger information, the radiation of the detection light by the light emitter.

10. The control device according to claim 9, wherein the trigger information related to the start of exposure includes: at least one of a still image shooting start signal, an autofocus start signal, a moving image shooting start signal, or an external signal from an external device.

11. The control device according to claim 9, wherein the interrupting, based on the trigger information, the radiation of the detection light by the light emitter includes: interrupting the radiation of the detection light by the light emitter at a timing at which the trigger information is acquired.

12. The control device according to claim 9, wherein the interrupting, based on the trigger information, the radiation of the detection light by the light emitter includes: interrupting the radiation of the detection light by the light emitter after a predetermined time has elapsed from a timing at which the trigger information is acquired.

13. The control device according to claim 8, wherein the instruction further comprising:
acquiring information on an exposure time for still image shooting or moving image shooting; and
determining whether to interrupt or not to interrupt the radiation of the detection light by the light emitter, based on the information on the exposure time and a threshold value.

14. An imaging device comprising:
a light control module including a light emitter that radiates detection light;
a control device that controls the light control module including a light emitter that radiates detection light; and
an imaging element that images imaging light transmitted through the light control module,
wherein the control device includes:
a processor; and
a storage medium storing an instruction to be executed by the processor,
wherein the instruction includes:
interrupting radiation of the detection light by the light emitter in at least part of an exposure period in which exposure is being performed in still image shooting or moving image shooting;
acquiring information on an exposure time for still image shooting or moving image shooting; and
determining whether to interrupt or not to interrupt the radiation of the detection light by the light emitter, based on the information on the exposure time and a threshold value,
wherein the threshold value includes at least one of a first threshold for still image shooting being 0.1 seconds or more or a second threshold for moving image shooting value being an exposure time of 60 fps or less.

15. The imaging device according to claim 14, wherein the light control module further includes:
a liquid crystal panel that adjusts light transmittance; and
a light receiver that receives the detection light, the light receiver including:
a first light receiving element that receives a first detection light that is part of the detection light and is transmitted through the liquid crystal panel; and
a second light receiving element that receives a second detection light that is part of the detection light and is not transmitted through the liquid crystal panel.

16. The imaging device according to claim 15, wherein the light control module further includes:
a transmittance calculator that calculates a liquid crystal transmittance of the liquid crystal panel, based on a first light receiving amount of light received by the first light receiving element and a second light receiving amount of light received by the second light receiving element; and
a light controller that controls transmittance of the liquid crystal panel, based on the liquid crystal transmittance calculated by the transmittance calculator.

17. The imaging device according to claim 15, wherein the liquid crystal panel includes:
a first surface on a side on which the light is incident; and
a second surface facing the first surface,
the light emitter is disposed on the first surface side of the liquid crystal panel, and
the light receiver and the imaging element are disposed on the second surface side of the liquid crystal panel.

* * * * *